Oct. 14, 1930.   D. T. WILLIAMS   1,778,177
DISTILLATION APPARATUS
Filed Nov. 20, 1925
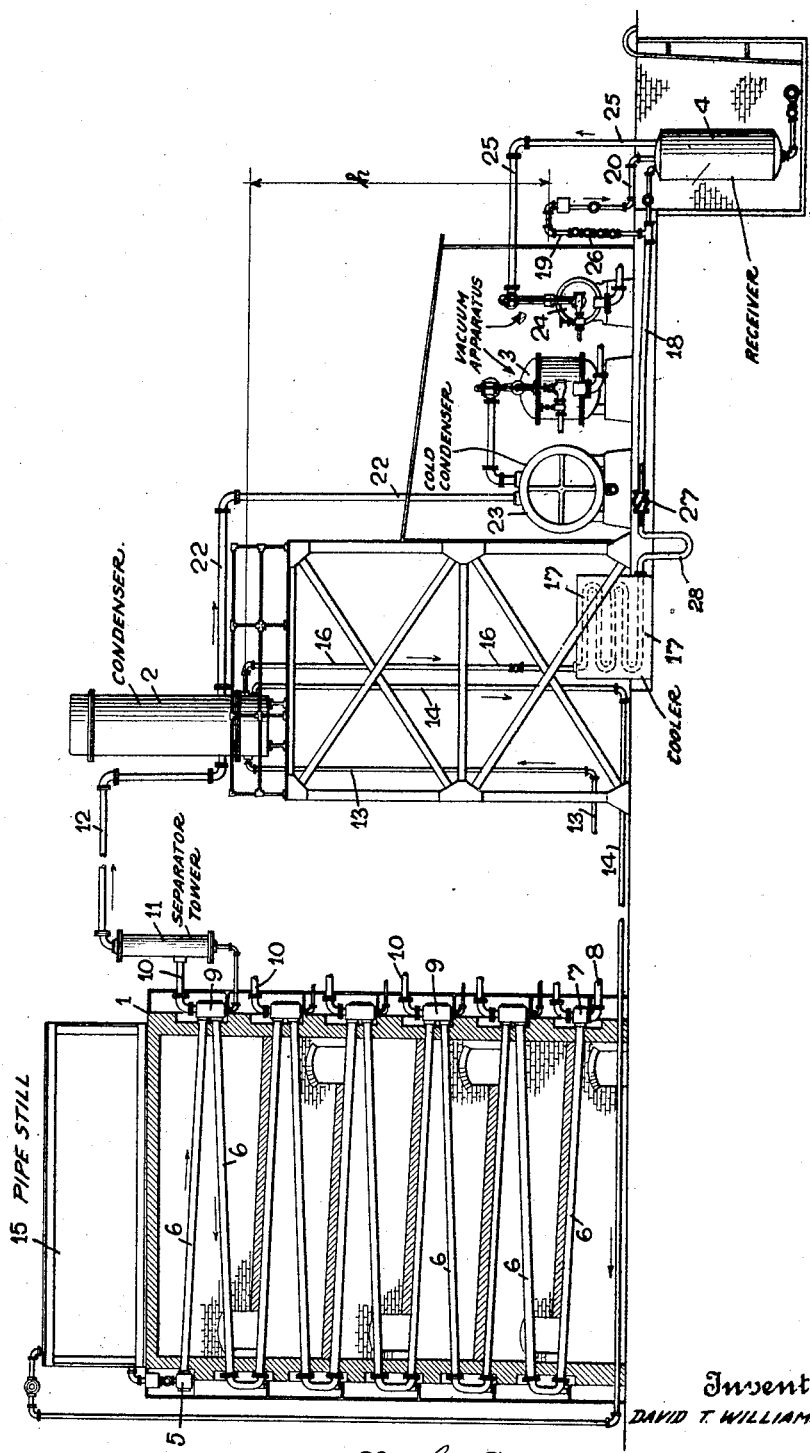
Inventor
DAVID T. WILLIAMS.
By his Attorneys Patented Oct. 14, 1930

1,778,177

UNITED STATES PATENT OFFICE

DAVID T. WILLIAMS, OF PATERSON, NEW JERSEY

DISTILLATION APPARATUS

Application filed November 20, 1925. Serial No. 70,218.

This invention relates to distillation apparatus and pertains more particularly to apparatus used for distilling mineral oils under vacuum.

It is an object of this invention to provide an apparatus in which the main portion of the distillation system, including the still proper and the condensers may be maintained under a certain degree of vacuum,— preferably a high vacuum, while the remainder of the system, including the distillate receivers, and the connections thereto from the condensers may be maintained under a less degree of vacuum or at atmospheric pressure.

A preferred embodiment of the invention selected for purposes of illustration is shown in the accompanying drawing, in which, the figure is a semi-diagrammatic view of the distillation system, certain parts being broken away or shown in section to better illustrate the construction and operation thereof.

Referring to the drawing, the distillation system consists in general of a still 1, condensers 2, vacuum apparatus 3 and distillate receivers 4. The still is of the continuous operation type in which a continuous flow of the oil to be treated is maintained from the intake header 5 through the inclined conduits 6 to the bottom header 7 of the still, from which the residue which is unvaporized may flow to suitable receiver tanks (not shown) through the conduit 8. The flow of oil through the conduits 6 of the still may be so adjusted as to provide only a thin stream or film of oil at the bottom of the conduits and the vapors evolved during the passage of the oil through the still may be removed at the headers 9 provided at intervals through the conduits 10 through the separator towers 11, and thence through conduits 12 to the condensers 2.

For purposes of heat economy the oil to be treated may be used as the cooling medium for the condensers 2 and may be introduced thereto through the pipe 13 and removed therefrom through the pipe 14 leading to the pre-heater or heat economizer 15 which in turn is connected to the intake header 5.

The distillate condensed in the condenser 2 may be removed through the pipe 16 and after passing through the cooling coil 17 may flow through the conduits 18, 19 and 20 to the distillate receivers 4 which may be conveniently arranged in underground pits.

In many known distillation systems in which vacuum is applied as a means of reducing decomposition, the entire distillation system, including the still, condensers and distillate receivers has been subjected to a substantially uniform vacuum throughout. In large commercial size stills, however, particularly where it is desired to maintain very high vacuums of 28" or 29" of mercury or even higher, difficulty has frequently been experienced in maintaining such vacuums due to the fact that small air leaks inevitably occur where large quantities of piping and many valves and connections are required. To overcome these difficulties applicant proposes to apply a high vacuum of the degree previously referred to only to those parts of the system where decomposition is reduced thereby, such as to the still proper and the condensers, and proposes to apply to the distillate receivers and to the connections leading thereto, in which the maintenance of a high vacuum serves no useful purpose, a less degree of vacuum, preferably created by an independent pump or set of pumps, or, if desired, vacuum may be dispensed with entirely in the distillate receivers and atmospheric pressure may be maintained therein.

In order to maintain the vacuum desired in the still and condensers, the condensers are connected by the conduit 22 through the cold condenser 23, adapted to condense any very light ends not condensed in the other condensers, to the vacuum apparatus 3 which may be of the steam ejector type. To maintain the lower degree of vacuum on the distillate receivers the additional vacuum apparatus 24 also of the steam ejector type may be connected thereto through the conduit 25.

In order to compensate for the difference in the degree of vacuum maintained in the still and condensers and that maintained in the distillate receivers a head of liquid is provided between the condenser 2 and the distillate receivers of sufficient height to balance the difference in vacuum. In the apparatus illustrated, the head of liquid is represented by the vertical distance $h$ between the liquid level in the condensers 2 and the liquid level at the top of the elbow formed by the pipe 19. For convenience, the condenser 2 may be elevated to secure the desired head, although as will be apparent the same result might be achieved by lowering the distillate receivers.

In order to simplify the drawing and description herein, a single condenser only has been illustrated, although it will be understood by those skilled in the art that additional condensers may be provided, connected to the vapor offtakes 10 and to the vacuum apparatus 3 and to the distillate receivers 4 in the same manner as the single condenser shown. Likewise as many additional distillate receivers may be provided as may be necessary to collect the different cuts. As will be understood, the condensers may be of the fractionating type so that several different cuts may be obtained from a single condenser. If desired, suitable blending valves 26 may be provided through which the various cuts may be blended to secure final products of the desired characteristics.

It may be desirable also to provide a check valve 27 in the conduit 18, in order that, if for any reason, the vacuum maintained by the vacuum apparatus 24 should fall below that which it is normally desired to maintain, the distillate will not be drawn back into the condensers 2, and the vacuum in the still proper will not be reduced or otherwise disadvantageously affected. The trap 28 may also be provided to prevent the passage of any air which may leak into the distillate receivers and connections from passing back into the condensers or still proper.

As will be apparent, with the described arrangement any desired difference in vacuum may be maintained in the two sections of the system by properly adjusting the distance $h$, or the distillate receivers may be maintained at atmospheric pressure. It will also be apparent that the described arrangement requires the application of the high vacuum which is desirable only to those portions of the system where it is desirable to prevent decomposition, and that those portions of the system where air leaks are most likely to occur, as in the receiver tanks and the numerous blending valves and connections which are necessary, may be maintained under a less degree of vacuum.

It will be understood that the invention may be variously modified and embodied within the scope of the subjoined claims.

I claim as my invention:

1. In a distillation system comprising a still, condenser and distillate receiver, means for maintaining said still and said condenser under a substantially uniform degree of vacuum throughout, and means to maintain said distillate receiver and the connections from said receiver to said condenser under a less degree of vacuum.

2. In a distillation system comprising a still, condenser and distillate receiver, means for maintaining said still and said condenser under a substantially uniform degree of vacuum throughout, means to maintain said distillate receiver under a less degree of vacuum, and means providing a head of liquid between said condenser and said receiver equal to the difference in vacuum therebetween.

3. In a distillation system comprising a still, condenser and distillate receiver, means for maintaining said still and said condenser under a substantially uniform degree of vacuum throughout, means to maintain said distillate receiver under a less degree of vacuum, means forming a passage connecting said condenser and receiver, said condenser being elevated above said receiver sufficiently to provide a head of liquid in said passage equal to the difference in vacuum between said condenser and receiver.

4. In a distillation system comprising a still, condenser and distillate receiver, means for maintaining said still and condenser under a substantially uniform degree of pressure less than atmospheric throughout, means to maintain said distillate receiver also under pressure less than atmospheric, but greater than that maintained in said still and connections from said condenser to said distillate receiver adapted to provide a head of liquid equal to the difference in absolute pressure therebetween.

5. In a distillation system comprising a still, condenser and distillate receiver, means for maintaining all of said elements at pressure less than atmospheric but for maintaining said still and condenser under a less degree of absolute pressure than said distillate receiver, and connections between said condenser and distillate receiver adapted to contain a head of liquid equal to the difference in absolute pressures therebetween.

In testimony whereof, I have signed my name to this specification this 16th day of November, 1925.

DAVID T. WILLIAMS.